US007315310B2

(12) United States Patent
Sakamoto et al.

(10) Patent No.: US 7,315,310 B2
(45) Date of Patent: Jan. 1, 2008

(54) CLIPPING DEVICE

(75) Inventors: Junichi Sakamoto, Kanagawa (JP); Hideki Takeuchi, Kanagawa (JP); Junichi Fujita, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/629,112

(22) Filed: Jul. 29, 2003

(65) Prior Publication Data
US 2004/0111452 A1   Jun. 10, 2004

(30) Foreign Application Priority Data
Jul. 31, 2002   (JP) .............................. 2002-223377

(51) Int. Cl.
*G09G 5/00*   (2006.01)
(52) U.S. Cl. ...................... 345/620; 345/623
(58) Field of Classification Search ......... 345/619–629
See application file for complete search history.

(56) References Cited

U.S. PATENT DOCUMENTS

| | | | | |
|---|---|---|---|---|
| 4,736,200 A | * | 4/1988 | Oununma | 345/625 |
| 5,157,764 A | * | 10/1992 | Priem et al. | 715/803 |
| 5,313,610 A | * | 5/1994 | Oliver et al. | 710/22 |
| 5,414,524 A | * | 5/1995 | Payson et al. | 382/173 |
| 5,720,019 A | * | 2/1998 | Koss et al. | 345/620 |
| 5,877,773 A | * | 3/1999 | Rossin et al. | 345/621 |
| 5,982,380 A | * | 11/1999 | Inoue et al. | 345/620 |
| 6,005,590 A | * | 12/1999 | Negishi et al. | 345/505 |
| 2001/0002124 A1 | * | 5/2001 | Mamiya et al. | 345/132 |
| 2003/0206173 A1 | * | 11/2003 | Kawai et al. | 345/558 |

FOREIGN PATENT DOCUMENTS

| JP | 09-270017 | 10/1997 |
|---|---|---|
| JP | 09-330419 | 12/1997 |
| JP | 10-293853 | 11/1998 |

* cited by examiner

*Primary Examiner*—Kee M. Tung
*Assistant Examiner*—Eric Woods
(74) *Attorney, Agent, or Firm*—Finnegan, Henderson, Farabow, Garrett & Dunner, L.L.P.

(57) ABSTRACT

A clipping device for reducing the number of processing cycles, and simplifying the circuit, while increasing the speed of the processing. The clipping device has a clip code generation circuit for generating clip codes corresponding to results of a comparison of vertex coordinates of a primitive and a judgment reference value of a multi-dimensional region and a negative value of the judgment reference value for the vertices of the primitive. The clipping device also includes: a current clip register for shifting the clip codes; clip registers able to replace the clip codes in accordance with a control signal; a control circuit outputting a control signal so as to replace the clip codes between clip registers when receiving a replacement instruction; and a logic circuit for performing a logic operation with respect to all bit data set in the clip registers. The device can also set a clip flag indicating whether or not the vertex to be judged is inside or outside a multi-dimensional region of an object to be drawn.

12 Claims, 13 Drawing Sheets

FIG. 5

| SIGN OF \|A\|-\|B\| | SIGN OF A | SIGN OF B | CLPC | |
|---|---|---|---|---|
| | | | A<-B JUDGMENT | A>B JUDGMENT |
| 0 | 0 | 0 | 0 | 1 |
| 0 | 0 | 1 | 0 | 1 |
| 0 | 1 | 0 | 1 | 0 |
| 0 | 1 | 1 | 1 | 0 |
| 1 | 0 | 0 | 0 | 0 |
| 1 | 0 | 1 | 1 | 1 |
| 1 | 1 | 0 | 0 | 0 |
| 1 | 1 | 1 | 1 | 1 |

FIG. 12A  RESULT A (6 BIT) OF 3 CLIPGEN
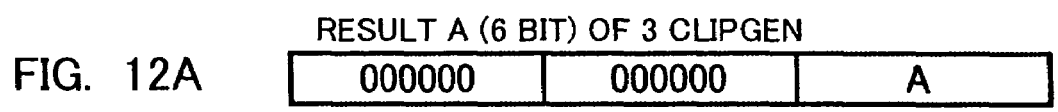
FIG. 12B  FIRST REPLACE
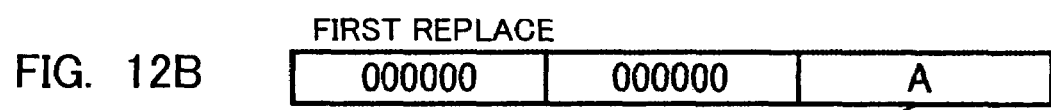
FIG. 12C
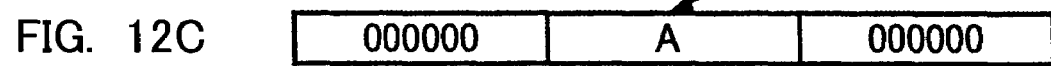
FIG. 12D  RESULT B (6 BIT) OF 3 CLIPGEN
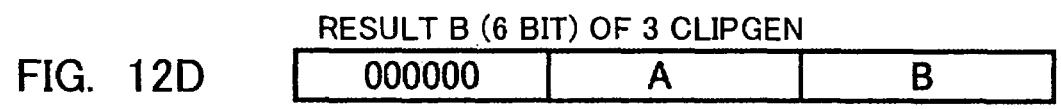
FIG. 12E  SECOND REPLACE
FIG. 12F
FIG. 12G  RESULT C (6 BIT) OF 3 CLIPGEN
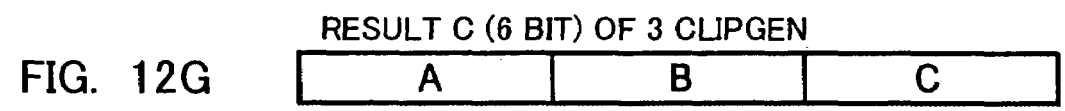

FIG. 13A
CASE OF TRIANGLE STRIP, THIRD AND FOLLOWING REPLACE
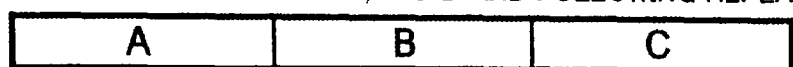
FIG. 13B
FIG. 13C
CASE OF TRIANGLE FAN, THIRD AND FOLLOWING REPLACE
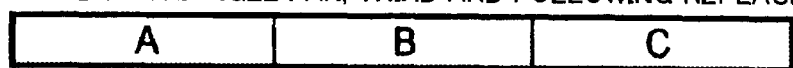
FIG. 13D
FIG. 13E
CASE OF TRIANGLE, RETURN TO INITIALIZATION STATE FOR EVERY THIRD REPLACE
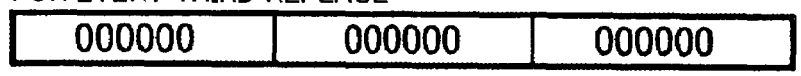

FIG. 14A RESULT A (6 BIT) OF 3 CLIPGEN
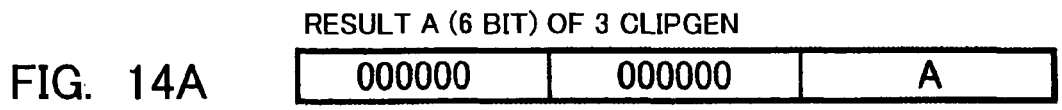
FIG. 14B FIRST REPLACE
FIG. 14C
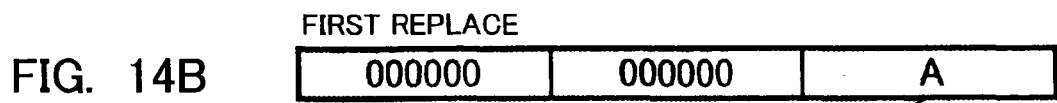
FIG. 14D RESULT B (6 BIT) OF 3 CLIPGEN
FIG. 15A CASE OF LINE STRIP, SECOND AND FOLLOWING REPLACE
FIG. 15B
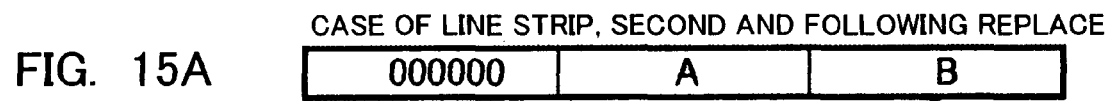
FIG. 15C IN CASE OF LINE, RETURN TO INITIALIZATION STATE FOR EVERY SECOND REPLACE
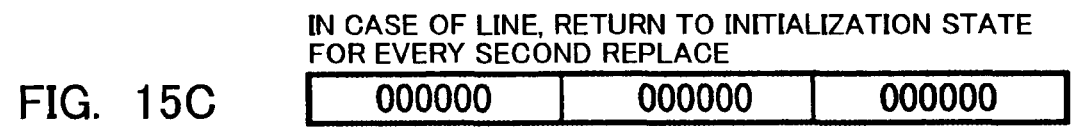
FIG. 16A RESULT A (6 BIT) OF 3 CLIPGEN
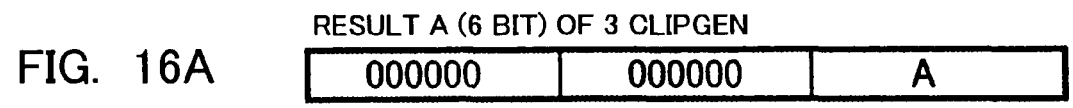
FIG. 16B N-TH REPLACE
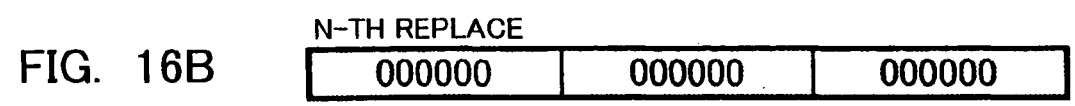

FIG. 18

| | | 1 | 2 | 3 | 4 | 5 | 6 | 7 | 8 |
|---|---|---|---|---|---|---|---|---|---|
| PRIMITIVE | PS | R | R | R | R | R | R | R | R |
| TRIANGLE_STRIP | 0 | 0 | 1 | 1 | 1 | 1 | 1 | 1 | 1 |
| TRIANGLE_FAN | 0 | 0 | 1 | 1 | 1 | 1 | 1 | 1 | 1 |
| TRIANGLE | 0 | 0 | 1 | 0 | 0 | 1 | 0 | 0 | 1 |
| LINE_STRIP | 0 | 1 | 1 | 1 | 1 | 1 | 1 | 1 | 1 |
| LINE | 0 | 1 | 0 | 1 | 0 | 1 | 0 | 1 | 0 |
| POINT | 1 | 1 | 1 | 1 | 1 | 1 | 1 | 1 | 1 |

·PS: AFTER PRIMSET
·R: AFTER REPLACE

CLIPPING DEVICE

BACKGROUND OF THE INVENTION

1. Field of the Invention

The present invention relates to a clipping device for judging whether or not vertices expressed by a predetermined coordinate system and a polyhedron connecting the same are inside or outside a multi-dimensional region of an object to be drawn in computer graphics.

2. Description of the Related Art

In three-dimensional computer graphics, a three-dimensional world coordinate system is assumed. Processing such as modeling conversion or field of vision conversion is carried out on an object existing there, then viewport conversion for displaying that in a two-dimensional device is performed.

At this time, clipping judgment for judging whether or not an object projected in the two-dimensions is in a projection plane becomes necessary. More specifically, the object is expressed by a group of polyhedrons as a polygon, so it is necessary to judge whether vertex coordinates of the polyhedrons are inside or outside a predetermined region.

In this inside/outside judgment, if the coordinates are expressed as homogeneous coordinates, it is judged if a certain point exists in a certain cube if the following equations are satisfied. That is, for a point P (x, y, z), if the point is in the cube shown in for example FIG. 1. The conditions of the point P existing in the region are as follows:

$-W \leq x \leq W$ $-W \leq y \leq W$ $-W \leq z \leq W$

In order to judge if a vertex is outside of a region under these conditions, it is necessary to perform the following total six comparison operations for one vertex with respect to the X, Y, and Z axes.

$X > W$ $X \leftarrow W$ $Y > W$ $Y \leftarrow W$ $Z > W$ $Z \leftarrow W$

If the coordinate X is larger than a judgment reference value W, if the coordinate X is smaller than $-W$, if the coordinate Y is larger than W, if the coordinate Y is smaller than $-W$, if the coordinate Z is larger than W, and if the coordinate Z is smaller than $-W$. It is judged as 1 when the results of the comparison satisfy the comparison conditions and judged as 0 when they do not satisfy the latter.

Namely, in the clipping device, for example when the coordinate X and the judgment reference value W are input, comparisons of whether the coordinate X is larger than the judgment reference value W and if the coordinate X is smaller than $-W$ are carried out. It is judged as, or determined to be 1 when true, while it is judged as, or determined to be 0 when false. Due to this, the clipping device can determine whether a vertex is outside of the region in the case of 1.

In the clipping device mentioned above, however, in order to determine if a vertex is outside of the region, a total of six comparison operations must be carried out for one vertex with respect to the X, Y, and Z axes, so the number of processing cycles increases.

As a result, in the conventional clipping device, there are the disadvantages that a further increase of speed of the processing is difficult and a dedicated clipping operation circuit is complicated.

SUMMARY OF THE INVENTION

An object of the present invention is to provide a clipping device able to reduce a processing cycle number, a simplification of the circuit, and speed-up the processing.

To attain the above object, according to a first aspect of the invention, there is provided a clipping device for judging whether or not vertices expressed by a predetermined coordinate system are inside or outside a multi-dimensional region of an object to be drawn, comprising a clip code generation circuit for generating clip codes obtained by setting data in accordance with results of a comparison of coordinates of the vertices and a judgment reference value of the multi-dimensional region and a negative value of the judgment reference value as bit data; clip registers for shifting the clip codes generated at the clip code generation circuit; and a logic circuit for performing a logic operation with respect to all bit data set in the clip registers and setting a clip flag indicating whether or not a vertex to be judged is inside or outside the multi-dimensional region of the object to be drawn.

Preferably, the coordinates of vertices include values corresponding to a plurality of coordinate axes of the predetermined coordinate system, the clip code generation circuit generates a plurality of clip codes corresponding to the coordinate axes, and the clip registers have a capacity for holding at least the plurality of clip codes.

Alternatively, the clip code generation circuit generates the clip codes based on code data obtained by subtracting an absolute value of the judgment reference value from the absolute value of the vertex coordinates, code data of the vertex coordinates, and code data of the judgment reference value.

According to a second aspect of the invention, there is provided a clipping device for judging whether vertices of a primitive expressed by a predetermined coordinate system are inside or outside of a multi-dimensional region of an object to be drawn, a polyhedron being drawn in units of primitives including a plurality of vertices, comprising a clip code generation circuit for generating clip codes obtained by setting data in accordance with results of comparison of vertex coordinates of the primitive and a judgment reference value of the multi-dimensional region and a negative value of the judgment reference value as bit data for the amount of the vertices of the primitive; a current clip register for a shifting the clip codes generated at the clip code generation circuit in accordance with a control signal; clip registers of at least a number smaller than the number of the vertices of the primitive by one cascade connected to an output of the current clip register and able to replace the held data with the clip codes held by the register of a previous stage in accordance with a control signal; a control circuit for outputting the control signal to the current clip register when receiving a clip code generation instruction to shift the clip codes generated at the clip code generation circuit and outputting the control signal to a corresponding clip register so as to replace the clip codes between adjacent clip registers including the current clip register when receiving a replacement instruction; and a logic circuit for performing a logic operation with respect to all bit data set in the clip registers including the current clip register and setting a clip flag indicating whether or not the vertex to be judged is inside or outside the multi-dimensional region of the object to be drawn.

Preferably, the control circuit outputs the control signal to a corresponding clip register so as to replace the clip codes along with the vertex processing in accordance with the type of the primitive.

Alternatively, the control circuit generates a vertex ready flag indicating that the vertices worth of clip codes of the primitive are ready at the time of execution of the replacement instruction.

Preferably, the control circuit selectively initializes a desired register among a plurality of clip registers including the current clip register under predetermined conditions.

According to the present invention, the clip code generation circuit compares the coordinates of the vertices and the judgment reference value of the multi-dimensional region and the coordinates of the vertices and the negative value of the judgment reference value. The clip code generation circuit generates clip codes set with data in accordance with the comparison results as the bit data. The clip codes generated at the clip code generation circuit are shifted to the clip registers. The logic circuit performs a logic operation with respect to all bit data set in the clip registers. As a result, a clip flag indicating whether or not a vertex to be judged is inside or outside the multi-dimensional region as the object to be drawn is set.

According to the present invention, when the control circuit receives a clip code generation instruction, the control signal is output to the current clip register, and the clip codes generated at the clip code generation circuit are shifted. Next, when the control circuit receives a replacement instruction, a control signal is output to the corresponding clip registers so as to replace the clip codes between adjacent clip registers including the current clip register. At this time, replacement of the clip codes along with new vertex processing is carried out in accordance with the type of the primitive. When the vertices worth of clip codes of the primitive are ready, a vertex ready flag indicating that they are ready is generated.

BRIEF DESCRIPTION OF THE DRAWINGS

These and other objects and features of the present invention will become more apparent from the following description of the preferred embodiments given in relation to the attached drawings, wherein:

FIG. 5 is a view for explaining judgment of a clip code generation circuit according to the embodiment;

FIGS. 12A-12G are views for explaining up to the second replacement in a case where the primitive is a triangle strip, a triangle, or a triangle fan;

FIGS. 13A-13E are views for explaining the third and following replacements in the case where the primitive is a triangle strip, a triangle, or a triangle fan;

FIGS. 14A-14D are views for explaining the replacement processing of the first time in a case where the primitive is a line strip or a line.

FIGS. 15A-15C are views for explaining the second and following replacements in the case where the primitive is a line strip or a line;

FIGS. 16A-16B are views for explaining replacement in the case where the primitive is a point;

FIG. 18 is a view of examples of the settings of a vertex ready flag VRDY according to the embodiment.

DESCRIPTION OF THE PREFERRED EMBODIMENTS

Figure 2:
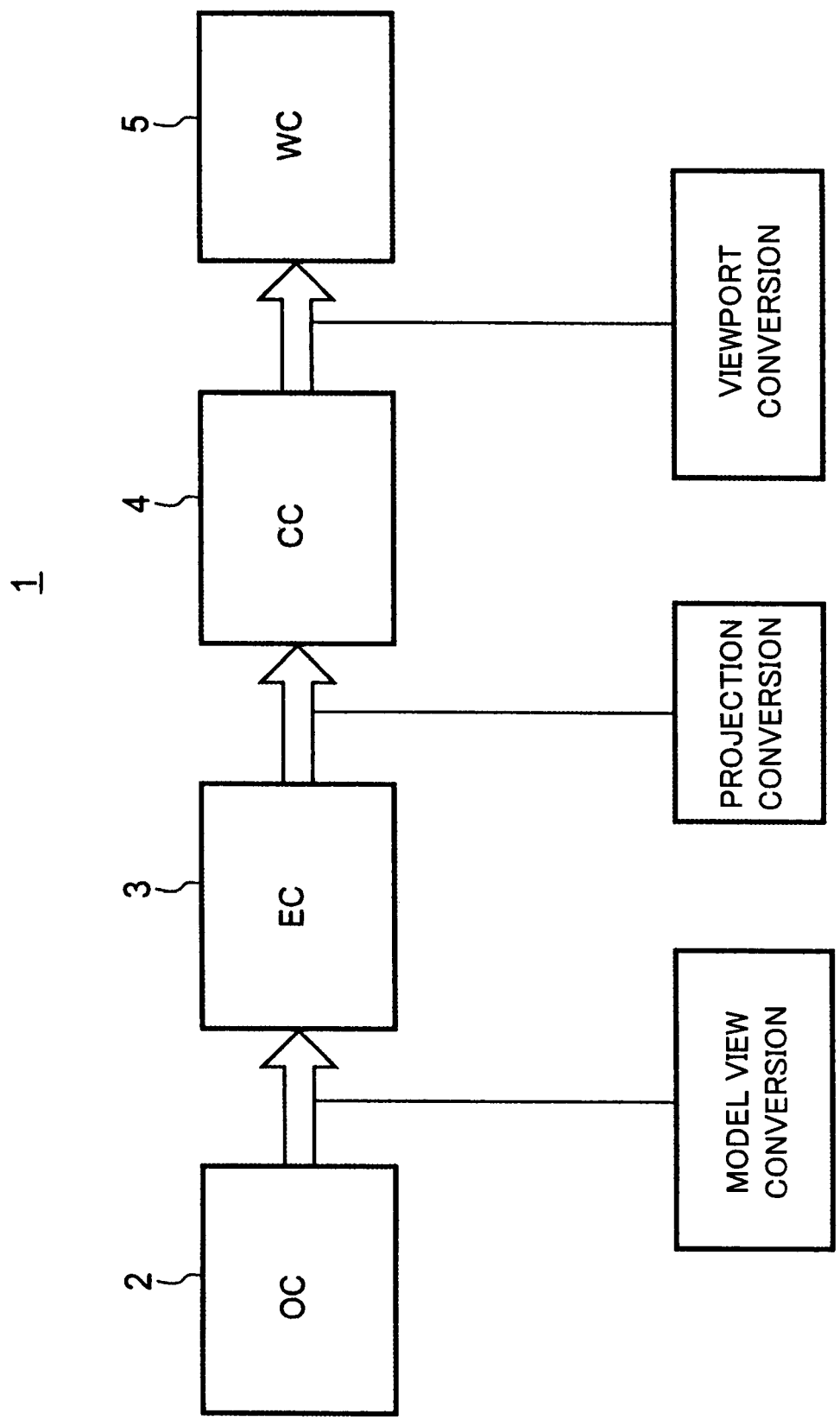
FIG. 2 is a block diagram of the basic configuration of a vertex coordinate conversion system in three-dimensional computer graphics according to the present invention.

FIG. 2 is a block diagram of the basic configuration of a vertex coordinate conversion system in three-dimensional computer graphics according to the present invention.

Figure 1:
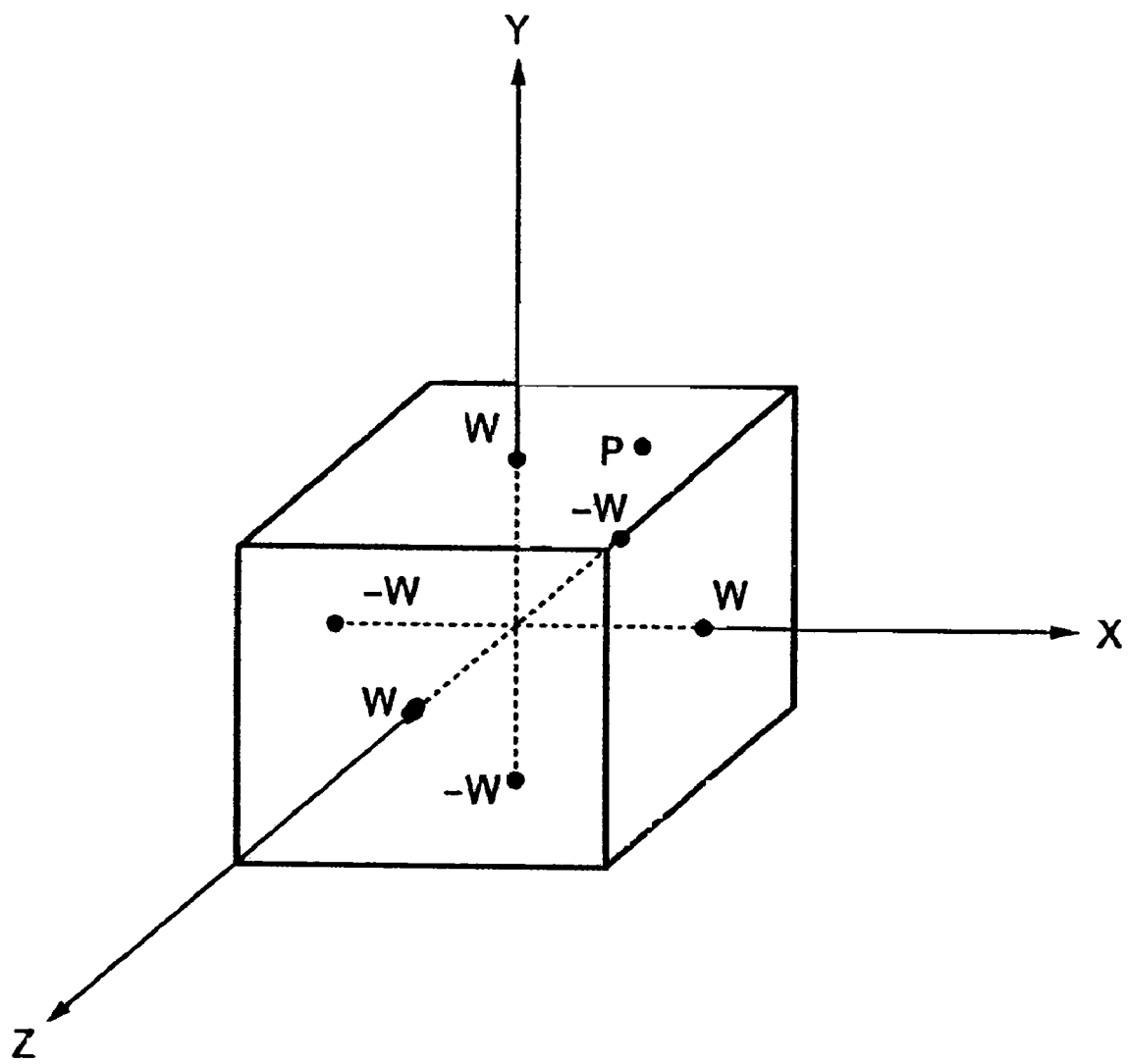
FIG. 1 is a view for explaining a region inside/outside judgment in clipping.

This vertex coordinate conversion system 1 has, as shown in FIG. 1, an object coordinate unit (OC) 2, an eye coordinate unit (EC) 3, a clip coordinate unit (CC) 4, and a window coordinate unit (WC) 5.

The object coordinate unit 2 generates a four-dimensional (x, y, z, w) coordinate system wherein all primitives are defined. The object coordinate unit 2 designates vertex coordinates and normals of all primitives by for example an IEEE single precision floating point or 16-bit signed fixed point. Further, the object coordinate unit 2 performs mode 1 view conversion on an object existing in the three-dimensional world coordinate system, generates four-dimensional coordinates by which the primitives are written, and outputs the same to the eye coordinate unit 3.

The object coordinate unit 2 performs the following model view conversion by using a 4×4 model view matrix (M). Here, the vertex coordinates in the object coordinate unit 2 are represented by $(x_o, y_o, z_o, w_o)$, and the vertex coordinates in the eye coordinate unit 3 are represented by $(x_e, Y_e, Z_e, W_e)$.

$$\begin{bmatrix} x_e \\ y_e \\ z_e \\ w_e \end{bmatrix} = M \begin{bmatrix} x_0 \\ y_0 \\ z_0 \\ w_0 \end{bmatrix}$$

Further, the object coordinate unit 2 performs lighting in the eye coordinate unit 3, so converts the normals from object coordinates to eye coordinates. Here, where a normal in the object coordinate unit 2 is $(N_{xo}, N_{yo}, N_{xo})$, the normal in the eye coordinate unit 3 is $(N_{xe}, N_{ye}, N_{xe})$, the model view matrix (4×4) is M, and a 3×3 sub matrix at the left top of M is $M_u$, the conversion of the normals from object coordinates to eye coordinates becomes as follows:

$$\begin{bmatrix} N_{xe} \\ N_{ye} \\ N_{ze} \end{bmatrix} = {}^T M_u^{-1} \begin{bmatrix} N_{x0} \\ N_{y0} \\ N_{z0} \end{bmatrix}$$

The eye coordinate unit 3 performs lighting and fogging converting and arranging the vertex coordinates and the normals of the primitive defined in the object coordinate unit 2 in the eye coordinate system. The point of view becomes the origin of the eye coordinate system, and the direction of the line of sight becomes the Z-axis direction. The eye coordinate unit 3 designates the vertex coordinates and normals of all primitives by for example an IEEE single precision floating point or 16-bit signed fixed point.

The eye coordinate unit 3 performs projection conversion in the following way using a 4×4 projection matrix (P) and outputs the result to the clip coordinate unit 4. Here, the vertex coordinates in the clip coordinate unit 4 are represented by ($x_c$, $y_c$, $z_c$, $w_c$).

$$\begin{bmatrix} x_c \\ y_c \\ z_c \\ w_c \end{bmatrix} = P \begin{bmatrix} x_e \\ y_e \\ z_e \\ w_e \end{bmatrix}$$

The clip coordinate unit 4 performs viewport conversion for display in a two-dimensional device in the projection converted three-dimensional coordinate system and outputs the result of conversion to the window coordinate unit 5.

The clip coordinate unit 4 judges whether an object projected in two dimensions is present in the projection plane, that is, performs clipping, at the time of viewport conversion. The processing of the clipping will be explained in detail later. By the judgment in the clipping, a region not satisfying the following conditions is no longer drawn. Here, W is the judgment reference value shown in FIG. 1.

$-W \leq x \leq W$ $-W \leq y \leq W$ $-W \leq z \leq W$

The clip coordinate unit 4 performs divides ($x_c$, $y_c$, $z_c$) by $w_c$ as follows after the clipping, then executing scaling and translation for viewport conversion. Here, the vertex coordinates in the window coordinate unit 5 are made ($x_w$, $y_w$, $z_w$).

$$\begin{bmatrix} x_w \\ y_w \\ z_w \end{bmatrix} = M \begin{bmatrix} s_x \cdot (x_c/w_c) + T_x \\ s_y \cdot (x_c/w_c) + T_y \\ s_z \cdot (x_c/w_c) + T_z \end{bmatrix}$$

The window coordinates in the window coordinate unit 5 are the coordinate system for the actual drawing, for example, a three-dimensional coordinate system wherein the top left end point is the origin, X is positive toward the right, Y is positive toward the bottom, and Z is positive toward the front.

Below, the clipping device in the clip coordinate unit 4 will be explained in detail in relation to the drawings.

Figure 3:
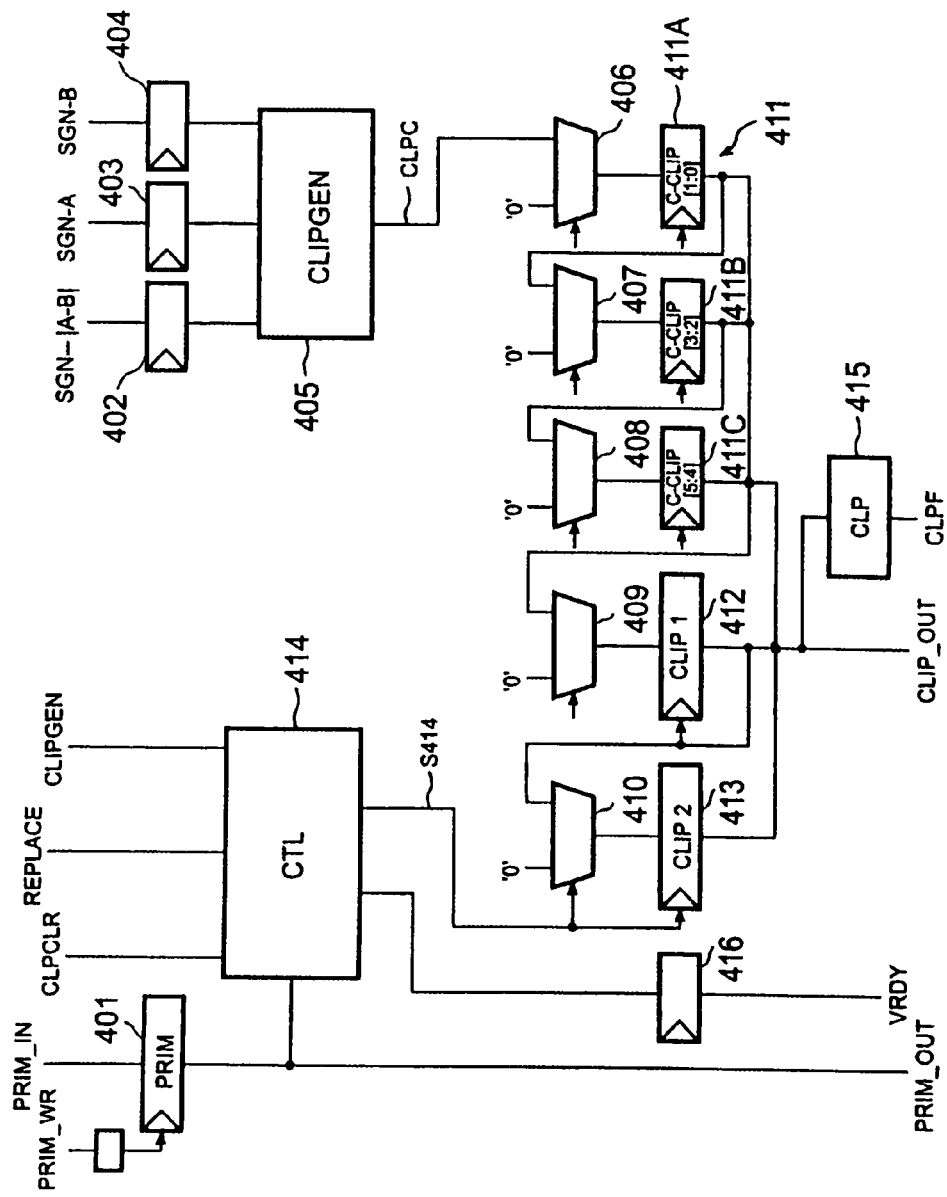
FIG. 3 is a circuit diagram of an embodiment of a clipping device according to an embodiment.

FIG. 3 is a circuit diagram of an embodiment of a clipping device according to the present invention.

A clipping device 400 has, as shown in FIG. 3, a primitive register (PROM) 401, input registers 402 to 404, a clip code generation circuit (CLIPGEN) 405, multiplexers (MUX) 406 to 410, clip registers 411 (A, B, C), 412, and 413 each consisting of 6 bits, a controller (CTL) 414, a logic circuit (CLP) 415, and an output register 416.

The primitive register 401 is set with information concerning the type of the primitive, specifically information indicating whether the type is a triangle strip, a triangle, a triangle fan, a line strip, a line, or a point.

The primitive register 401 supplies the set information to the controller 414 and a parameter file storing data such as elements of a not illustrated conversion matrix.

The input register 402 is set with, among the operation results found in a so-called geometry operation unit, the (sign of |A|-|B|) SGN-|A-B| necessary for the inside/outside judgment in the clipping.

The input register 402 supplies the set data (sign of |A|-|B|) SGN-|A-B| to the clip code generation circuit 405.

Here, A is the coordinate value and is given as the coordinates x, y, z of X, Y, Z in the present embodiment. Further, B is the judgment reference value and corresponds to W of FIG. 1. The same is true for the following.

The input register 403 is set with, among the operation results found in the geometry operation unit, the (sign of A) SGN-A necessary for inside/outside judgment in the clipping.

The input register 403 supplies the set data (sign of A) SGN-A to the clip code generation circuit 405.

The input register 404 is set with, among the operation results found in the geometry operation unit, the (sign of B) SGN-B necessary for the inside/outside judgment in the clipping.

The input register 404 supplies the set data (sign of B) SGN-B to the clip code generation circuit 405.

Here, the data set in the input registers 402 to 404 will be further explained.

For the modeling conversion, field of vision conversion, and projection conversion of the object in the above world coordinate system, one type of floating point multiplier-adder referred to as a geometry operation unit is required. For example, a matrix operation of 4.times.4 elements is necessary for the movement, rotation, magnification, or other conversion of the object. The geometry operation unit functions to perform this processing. The operation unit is provided with an adder too and can perform subtraction as well. The addition and subtraction are first performed by the operation of |A|+|B| or |A|-|B| without using signs (that is, by the absolute values), then by deriving the final computation result from the signs of A and B. Specifically, the sign bits are ignored and the exponentials are combined for subtraction. The result becomes 1 if positive and becomes 0 if negative.

The inside/outside judgment with respect to a predetermined region in the clipping can be carried out by using the result of part of the function of the operation unit, that is, the subtraction |A|-|B|, and the signs of A and B.

Figure 4:
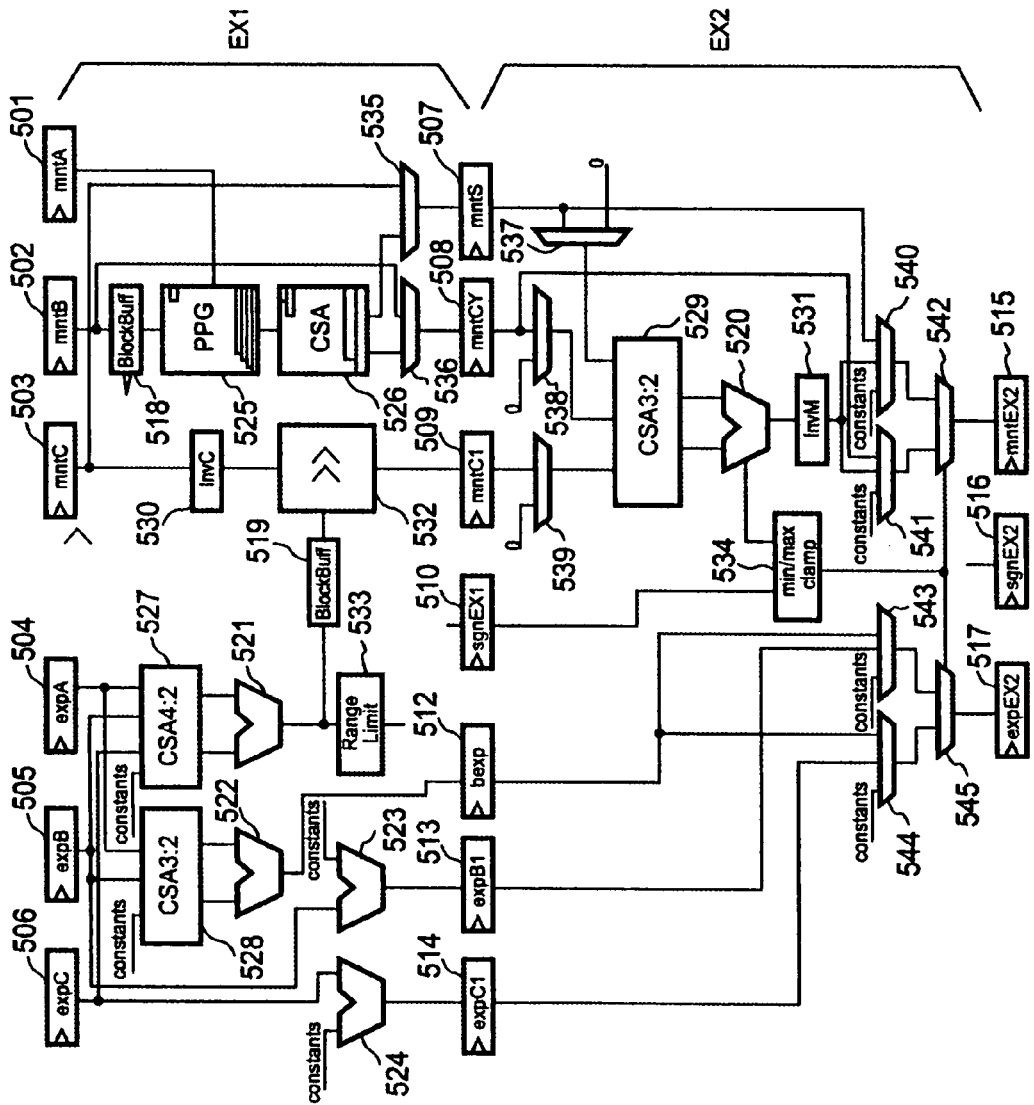
FIG. 4 is a circuit diagram of an example of the configuration of a floating point multiplier-adder.

FIG. 4 is a circuit diagram of an example of the configuration of a floating point multiplier-adder.

This operation unit 500 has, as shown in FIG. 4, registers 501 to 517, block buffers 518 and 519, adders 520 to 524, a partial product generator 525, carry save adders (CSA) 526 to 529, inversion circuits 530 and 531, a shifter 532, a limiter 533, a clamp circuit 534, and multiplexers 535 to 545.

In this operation unit 500, the PPG 525 generates partial products. By adding these partial products at the CSA 526 configured in a Wallace or other tree, the carry is output to one output, and the sum is output to the other output.

The CSA 529 performs operation and supplies the carry and sum outputs to the adder 520. Then, the adder 520 generates |A|-|B|. As mentioned above, the sign bits are ignored and the exponentials are combined for the subtraction. The result becomes 1 if positive and 0 if negative.

Returning to FIG. 3, the clip code generation circuit 405 judges if A>B and judges if A←B based on the data (sign of |A|-|B|) SGN-|A-B|, the data (sign of A) SGN-A, and the data (sign of B) SGN-B set in the input registers 402 and 404, generates the 2-bit clip code CLPC indicating the results of the two judgments by the logic 1 or 0, and outputs the result to the multiplexer 406.

The clip code judgment generation circuit 405 sets the judgment result of A>B at the lower 0 bit in the 2-bit clip code CLPC and sets the judgment result of A←B at the higher 1 bit in the 2-bit clip code CLPC.

The clip code generation circuit 405 performs the judgment of A>B and the judgment of A←B as shown in FIG. 5 for eight types of input where the positive state of the (sign of |A|-|B|) SGN-|A-B|, the (sign of A) SGN-A, and the (sign of B) SGN-B are 0 when positive and 1 when negative.

Specifically, when the (sign of |A|-B|) SGN-|A-B|, the (sign of A) SGN-A, and the (sign of B) SGN-B are (0, 0, 0), the clip code CLPC becomes (0, 1).

Thereafter, the clip code CLPC becomes (0, 1) at the time (0, 0, 1), the clip code CLPC becomes (1, 0) at the time (0, 1, 0), the clip code CLPC becomes (1, 0) at the time (0, 1, 1), the clip code CLPC becomes (0, 0) at the time (1, 0, 0), the clip code CLPC becomes (1, 1) at the time (1, 0, 1), the clip code CLPC becomes (0, 0) at the time (1, 1, 0), and the clip code CLPC becomes (1, 1) at the time (1, 1, 1).

Figure 6:
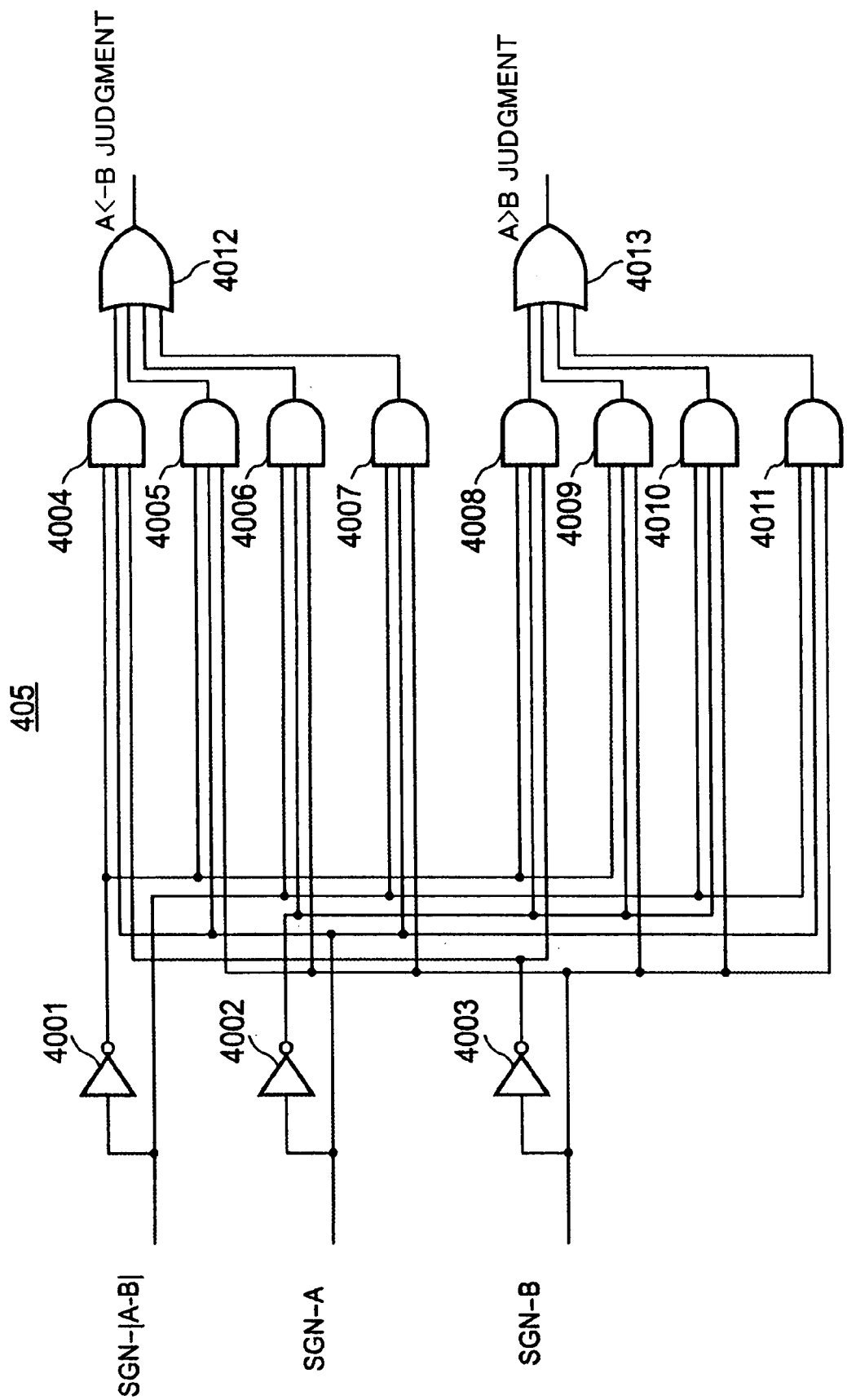
FIG. 6 is a circuit diagram of a concrete example of the configuration of clip code generation circuit according to the embodiment.

FIG. 6 is a circuit diagram of an example of the configuration of the clip code generation circuit 405 according to the present embodiment.

The clip code generation circuit 405 has, as shown in FIG. 6, inverters 4001 to 4003, 3-input AND gates 4004 to 4011, and 4-input OR gates 4012 and 4013.

The input of the inverter 4001 is connected to an input line of the data (sign of |A|-|B|) SGN-|A-B|, the input of the inverter 4002 is connected to the input line of the data (sign of A) SGN-A, and the input of the inverter 4003 is connected to the input line of the data (sign of B) SGN-B.

A first input of the AND gate 4004 is connected to the output of the inverter 4001, a second input is connected to the input line of the data (sign of A) SGN-A, a third input is connected to the output of the inverter 4003, and the output is connected to the first input of the OR gate 4012.

The first input of the AND gate 4005 is connected to the output of the inverter 4001, the second input is connected to the input line of the data (sign of A) SGN-A, the third input is connected to the input line of the data (sign of B) SGN-B, and the output is connected to the second input of the OR gate 4012.

The first input of the AND gate 4006 is connected to the input line of the data (sign of |A|-|B|), SGN-|A-B|, the second input is connected to the output of the inverter 4002, the third input is connected to the input line of the data (sign of B) SGN-B, and the output is connected to the third input of the OR gat 4012.

The first input of the AND gat 4007 is connected to the input line of the data (sign of |A|-|B|) SGN-|A-B|, the second input is connected to the input line of the data (sign of A) SGN-A, the third input is connected to the input line of the data (sign of B) SGN-B, and the output is connected to a fourth input of the OR gate 4012.

The first input of the AND gate 4008 is connected to the output of the inverter 4001, the second input is connected to the output of the inverter 4002, the third input is connected to the output of the inverter 4003, and the output is connected to the first input of the OR gate 4013.

The first input of the AND gate 4009 is connected to the output of the inverter 4001, the second input is connected to the output of the inverter 4002, the third input is connected to the input line of the data (sign of B) SGN-B, and the output is connected to the second input of the OR gate 4013.

The first input of the AND gate 4010 is connected to the input line of the data (sign of JA|-|B|) SGN-|A-B|, the second input is connected to the output of the inverter 4002, the third input is connected to the input line of the data (sign of B) SGN-B, and the output is connected to the third input of the OR gate 4013.

The first input of the AND gate 4011 is connected to the input line of the data (sign of JA|-|B|) SGN-|A-B|, the second input is connected to the input line of the data (sign of A) SGN-A, the third input is connected to the input line of the data (sign of B) SGN-B, and the output is connected to the fourth input of the OR gate 4013.

The judgment result 1 or 0 of A←B is output from the OR gate 4012, and the judgment result 1 or 0 of A>B is output from the OR gate 4013.

The circuit of FIG. 6 realizes a truth table of FIG. 5. Namely, when the (sign of |A|-|B|) SGN-|A-B|, the (sign of A) SGN-A, and the (sign of B) SGN-B are (0, 0, 0), only the output of the AND gate 4008 becomes 1. The outputs of the other AND gates 4004 to 4007 and 4009 to 4011 become 0. As a result, the output of the OR gate 4012 becomes 0, the output of the OR gate 4013 becomes 1, and the clip code CLPC becomes (0, 1).

When the (sign of |A|-|B|) SGN-|A-B|, the (sign of A) SGN-A, and the (sign of B) SGN-B are (0, 0, 1), only the output of the AND gate 4009 becomes 1. The outputs of the other AND gates 4004 to 4008 and 4010 and 4011 become 0. As a result, the output of the OR gate 4012 becomes 0, the output of the OR gate 4013 becomes 1, and the clip code CLPC becomes (0, 1).

When the (sign of |A|-|B|) SGN-|A|-|B|, the (sign of A) SGN-A, and the (sign of B) SGN-B are (0, 1, 0), only the output of the AND gate 4004 becomes 1. The outputs of the other AND gates 4005 to 4011 become 0. As a result, the output of the OR gate 4012 becomes 1, the output of the OR gate 4013 becomes 0, and the clip code CLPC becomes (1, 0).

When the (sign of |A|-|B|) SGN-|A-B|, the (sign of A) SGN-A, and the (sign of B) SGN-B are (1, 0, 0), the outputs of all AND gates 4004 to 4011 become 0. As a result, the output of the OR gate 4012 becomes 0, the output of the OR gate 4013 becomes 0, and the clip code CLPC becomes (0, 0).

When the (sign of |A|-|B|) SGN-|A-B|, the (sign of A) SGN-A, and the (sign of B) SGN-B are (1, 0, 1), the outputs of the AND gates 4006 and 4010 become 1, and the outputs of the other AND gates 4004, 4005, 4007 to 4009, and 4011 become 0. As a result, the output of the OR gate 4012 becomes 1, the output of the OR gate 4013 becomes 1, and the clip code CLPC becomes (1, 1).

When the (sign of |A|-|B|) SGN-|A-B|, the (sign of A) SGN-A, and the (sign of B) SGN-B are (1, 1, 0), the outputs of all AND gates 4004 to 4011 become 0. As a result, the output of the OR gate 4012 becomes 0, the output of the OR gate 4013 becomes 0, and the clip code CLPC becomes (0, 0).

When the (sign of |A|-|B|) SGN-|A-B|, the (sign of A) SGN-A, and the (sign of B) SGN-B are (1, 1, 1), the outputs of the AND gates 4007 and 4011 become 1, and the outputs of the other AND gates 4004 to 4006 and 4008 to 4010 become 0. As a result, the output of the OR gate 4012 becomes 1, the output of the OR gate 4013 becomes 1, and the clip code CLPC becomes (1, 1).

Returning to FIG. 3 again, the multiplexer 406 selects either of the clip code CLPC or 0 (parameter for initialization) from the clip code generation circuit 405 in accordance with the control signal S414 of the controller 414 and outputs the same to lower 2 bits of the register 411A of the clip register 411.

The multiplexer 407 selects either of the output of the clip register 411A or 0 in accordance with the control signal S414 of the controller 414 and outputs the same to the middle 2 bits of the register 411B of the clip register 411.

The multiplexer 408 selects either of the output of the clip register 411B or 0 in accordance with the control signal S414 of the controller 414 and outputs the same to the upper 2 bits of the register 411C of the clip register 411.

The multiplexer 409 selects either of the output of the clip register 411 (411A to 411C) or 0 in accordance with the control signal S414 of the controller 414 and outputs the same to the clip register 412.

The multiplexer 410 selects either of the output of the clip register 412 or 0 in accordance with the control signal S414 of the controller 414 and outputs the same to the clip register 413.

The clip register 411 is set with the 2-bit information for each of the X-axis, Y-axis, and Z-axis, that is, the clip code CLPC, or the parameter 0 for initialization.

Figure 7:
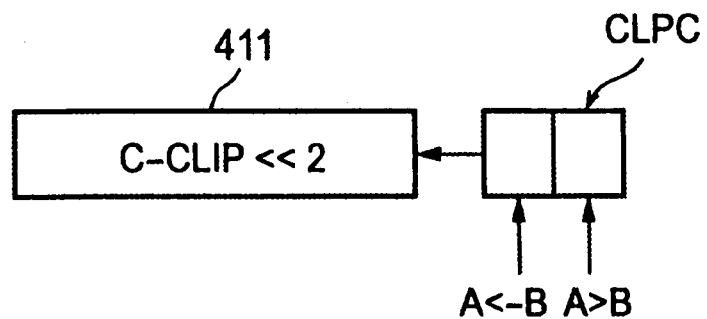
FIG. 7 is a view of the clip codes being shifted in a current clip register.

The clip register 411 shifts the clip codes 2 bits at a time as shown in FIG. 7 in accordance with the control signal S414 of the controller 414 to sequentially send the clip codes for 3 axes into the register and thereby store them as 6 bits of information.

The clip register 411 functions as the current clip register (C-CLIP) and shifts 2 bits of the judgment results of A←B and A>B, that is, the clip code CLPC, when the CLIPGEN_A,B instruction is executed.

Figure 8:
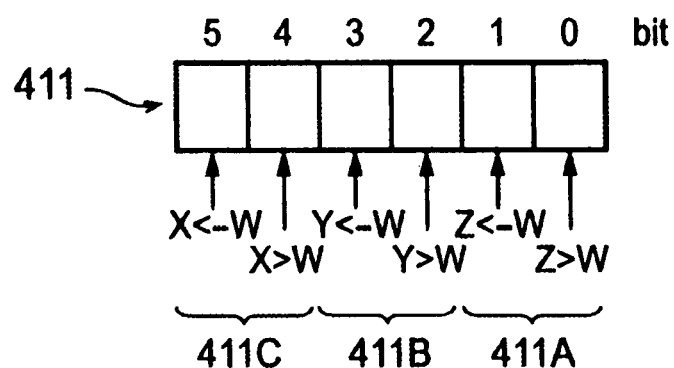
FIG. 8 is a view of values of 6 bits of the current clip register when continuously executing CLIPGEN_X,W, CLIPGEN_Y,W, and CLIPGEN_Z,W.

When executing the CLIPGEN instruction three times, specifically, when continuously executing CLIPGEN_X,W, CLIPGEN_Y,W, and CLIPGEN_Z,W when A is the coordinate of the three axes X, Y, and Z and B is the judgment reference value W, the values of the 6 bits of the clip register 411 become as shown in FIG. 8 and the following:

bit5: (X←W)?1:0
bit4: (X>W)?1:0
bit3: (Y←W)?1:0
bit2: (Y>W)?1:0
bit1: (Z←W)?1:0
bit0: (Z>W)?1:0

Namely, the judgment result 1 or 0 of X←W is shifted to the bit 5, the judgment result 1 or 0 of X>W is shifted to the bit 4, the judgment result 1 or 0 of Y←W is shifted to the bit 3, the judgment result 1 or 0 of Y>W is shifted to the bit 2, the judgment result 1 or 0 of Z←W is shifted to the bit 1, and the judgment result 1 or 0 of Z>W is shifted to the bit 0.

Then, returning to FIG. 3, the output of the current clip register 411A is supplied to the multiplexer 407, and the output of the current clip register 411B is supplied to the multiplexer 408. The current clip registers 411A to 411C, that is, the current clip registers 411, output the 6-bit output to the multiplexer 409, the logic circuit 415, and the processing circuit of the following stage.

In three-dimensional computer graphics, the surface of the object is drawn as a polygon, specifically a polyhedron, by a set of triangles. This drawing unit based on triangles will be referred to as a "primitive". The primitive has become a basic part in computer graphics processing.

Therefore, in the present embodiment, in order to secure 3 vertice's worth of capacity when the capacity of the clip register is one triangle's worth, a 6-bit clip register (CLIP1) 412 and a 6-bit clip register (CLIP2) 413 are provided in addition to the clip register 411 and the three vertices' worth of capacity is made 18 bits.

The clip register (CLIP1) 412 shifts the content of the 6 bits of the clip register 411 via the multiplexer 409 in accordance with the control signal S414 of the controller 414 and outputs the shifted content to the logic circuit 415 and the processing circuit of the following stage.

The clip register (CLIP2) 413 shifts the content of the 6 bits of the clip register 412 via the multiplexer 410 in accordance with the control signal S414 of the controller 414 and outputs the shifted content to the logic circuit 415 and the processing circuit of the following stage.

The logic circuit 415 takes the OR logic of the 18 bits of outputs of the clip registers 411, 412, and 413 to generate a 1-bit clip flag CLPF.

If any bit among the 18 bits of outputs of the clip registers 411, 412, and 413 is 1, the logic circuit 415 generates a clip flag CLPF indicating each.

Namely, the clipping device 400 performs the processing of the basic primitives, that is, the triangles, continuously, then judges if the three vertices are inside the region of the projection cube referring to the clip flag CLPF.

In the present embodiment, the clipping device 400 judges the vertices are outside of the region when 1 is set in the clip flag CLPF and judges they are inside of the region when 0 is set.

Figure 9:
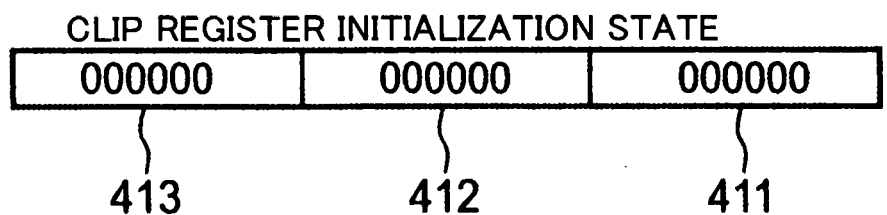
FIG. 9 is a view of an initialization state of the clip register when executing a clip clear instruction CLPCLR.

When receiving the clip clear instruction CLPCLR, the controller 414 outputs the control signal S414 to the clip registers 411 to 413 so that the multiplexers 406 to 410 select the initialization parameter 0 and so that 0 is set in all bits of the clip registers 411, 412, and 413 as shown in FIG. 9.

When receiving the clip code generation instruction CLIPGEN, the controller 414 outputs the control signal S414 to the clip registers 411 to 413 so that the multiplexers 406 to 410 select the clip code CLPC from the clip code generation circuit 405 and so that the output contents of the clip registers 411A, 411B, 411C, 411, and 412 of the previous stage and the content of the register of the previous stage are shifted.

When receiving the replacement instruction REPLACE, the controller 414 outputs the control signal S414 to the multiplexers 406 to 410 and the clip registers 411 to 413 so as to replace the clip codes along with the new vertex processing in accordance with the type of the primitive set in the primitive register 401.

The controller 414 generates a vertex ready flag VRDY indicating that the three vertice's worth of clip code is ready (indicating that preparations are completed) and sets it in the output register 416 at the time of the execution of the replacement instruction REPLACE.

Below, an explanation will be given of the reason why replacement is necessary.

Figure 10:
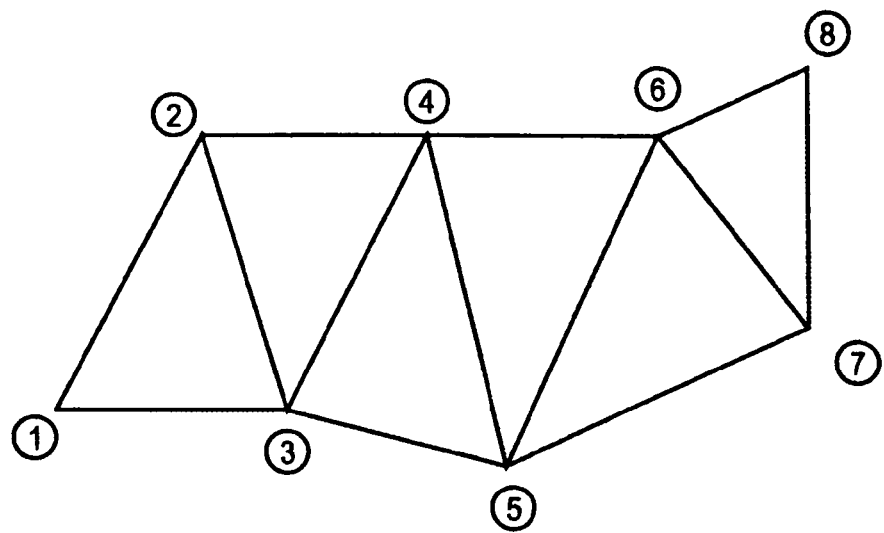
FIG. 10 is a view for explaining processing when drawing a polyhedron by a primitive of continuous triangles referred to as a triangle strip.

A polyhedron can be drawn by for example a primitive of continuous triangles referred to as a triangle strip as shown in FIG. 10. The numbers in the figure indicate a processing sequence of the vertices.

To judge whether each vertex is inside or outside the region, it is necessary to judge this for all points from [1] to [3] and then necessary to judge this for the three coordinates immediately before. For example, at the vertex [6], the judgment is made for [4], [5], and [6].

Figure 11:
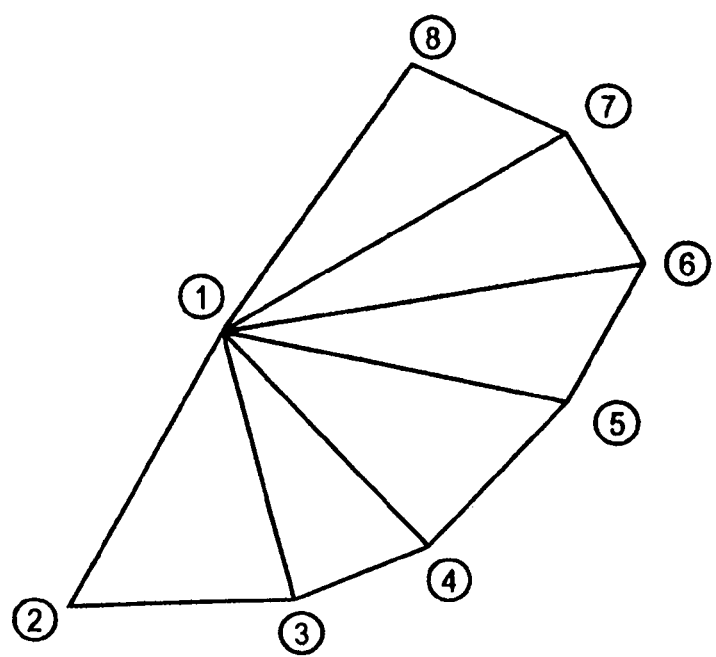
FIG. 11 is a view for explaining processing when drawing a polyhedron by a primitive of continuous triangles referred to as a triangle fan.

Further, as shown in FIG. 11, there is a primitive of continuous triangles referred to as a triangle fan. In a similar case, up to [3], all points have to be judged. It is necessary to judge the start point and the two coordinates immediately before. For example, at the vertex [6], the judgment is made for [1], [5], and [6].

The controller 414 according to the present embodiment controls the multiplexers 406 to 410 and the clip registers 411 to 413 so as to store three vertices suitable for judgment in the clip registers 411 to 413 for storing three vertice's worth of results for every primitive.

Under the control of the controller 414, the primitive to be processed is stored in the clip registers 411 to 413. Whenever a vertex is processed, the three vertices worth of judgment results always necessary when storing one vertice's worth of judgment results are stored.

In this way, when the replacement instruction REPLACE is issued, a replacement operation is carried out in accordance with the type of the primitive set in the primitive register 401. Below, an explanation will be given of the replacement operation of the contents of the clip registers for every primitive.

When the primitive is a triangle strip, a triangle, or a triangle fan, as shown in FIGS. 12A to 12G, up to the second time, each clip register is shifted by 6 bits for entering the results.

At the first replacement, as shown in FIGS. 12B and 12C, the content A of the clip register 411 is shifted to the clip register 412 and the clip register 411 is reset to 0 in all bits.

Next, as shown in FIG. 12D, the content B is set in the clip register 411.

Then, at the second replacement, as shown in FIGS. 12E and 12F, the content A of the clip register 412 is shifted to the clip register 413, the content B of the clip register 411 is shifted to the clip register 412, and the clip register 411 is reset to 0 in all bits. Next, as shown in FIG. 12G, the content C is set in the clip register 411.

In the third and following replacement instructions, the operation differs according to the type of the primitive.

When the primitive is a triangle strip, in the third and following times, as shown in FIGS. 13A and 13B, the content B of the clip register 412 is shifted to the clip register 413, the content C of the clip register 411 is shifted to the clip register 412, and the clip register 411 is reset to 0 in all bits.

When the primitive is a triangle fan, in the third and following replacements, as shown in FIGS. 13C and 13D, the content A of the clip register 413 is shifted to the clip register 413, the content C of the clip register 411 is shifted to the clip register 412, and the clip register 411 is reset to 0 in all bits. When the primitive is a triangle, as shown in FIG. 13E, at every third replacement, the clip registers 411 to 413 are reset to 0 in all bits and return to the initialization state.

When the primitive is a line strip or a line, as shown in FIGS. 14A to 14D, at the first replacement, the content A of the current clip register 411 are shifted to the clip register 412 by 6 bits, and the clip register 411 is reset to 0 in all bits.

When the primitive is a line strip or a line, in the second and following replacement instructions, the operation differs according to the type of the primitive.

When the primitive is a line strip, at the second and following replacements, as shown in FIGS. 15A and 15B, the content B of the current clip register 411 is shifted to the clip register 412, and the clip register 411 is reset to 0 in all bits. When the primitive is a line, as shown in FIG. 15C, at every second replacement, the clip registers 411 to 413 are reset to 0 in all bits and return to the initialization state.

When the primitive is a point, as shown in FIGS. 16A and 16B, the current clip register 411 is reset to 0 in all bits for every replacement.

By this configuration, the clipping device 400 can suitably perform processing according to which point of the triangle is outside when a vertex is outside of the region.

Figure 17:
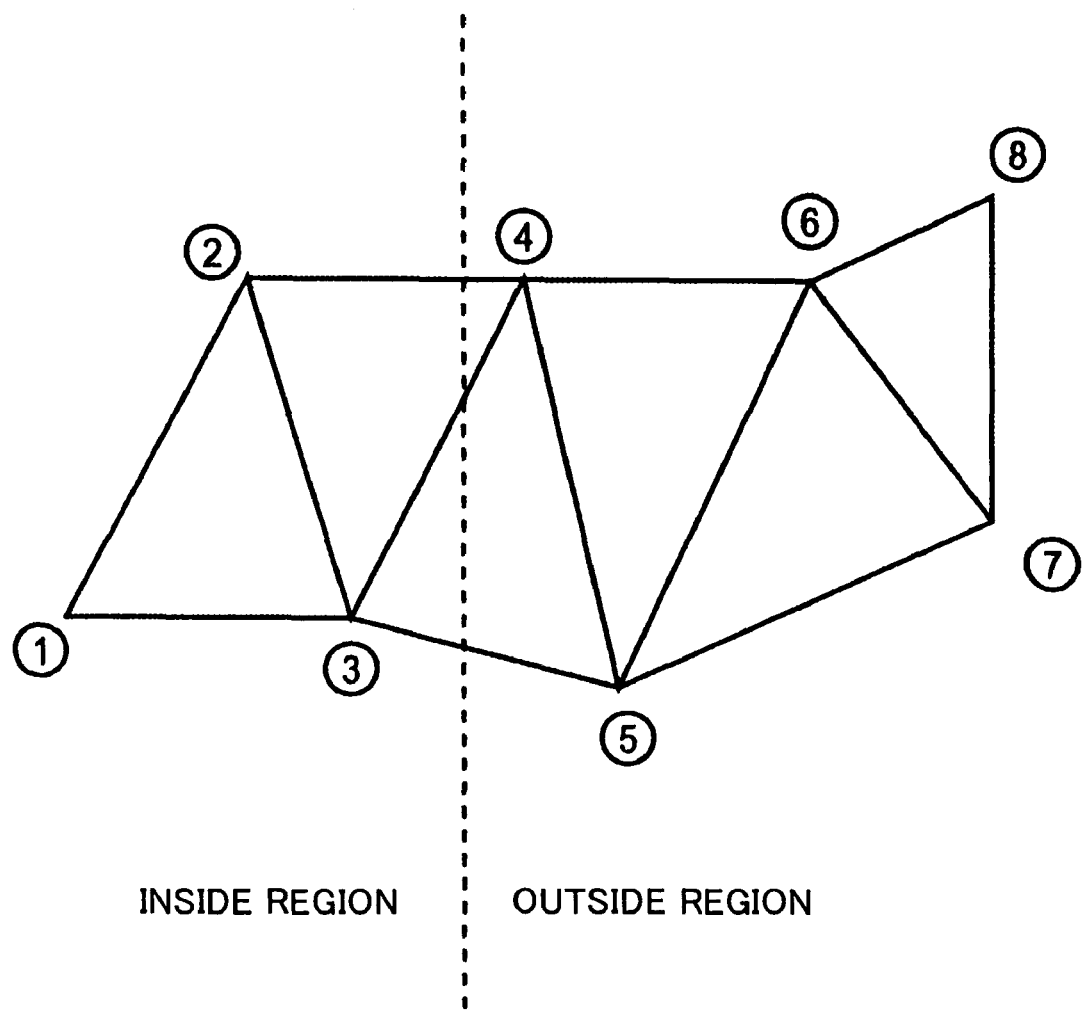
FIG. 17 is a view for explaining if it is possible to suitably perform processing according to which point of a triangle goes out when a vertex becomes outside the region.

That is, in the case of the example shown in FIG. 17, it is possible to perform processing to draw the portion inside the region when the vertices [4] and [5] are outside of the region and to decide not to draw at all at [6] since all of [4], [5], and [6] are outside of the region.

Further, the controller 414 according to the present embodiment generates a 1-bit vertex ready flag VRDY indicating if the primitive elements are ready (indicating that the vertex preparation is completed) according to the type of the primitive as mentioned above.

The operation for generation of this vertex ready flag VRDY is synchronized with the replacement REPLACE function, so simultaneous decision is possible. By this, more efficient processing becomes possible.

FIG. 18 is a view of an example of setting the vertex ready flag VRDY according to the present embodiment.

The example of FIG. 18 shows a case where the replacement instruction is tried eight times after the primitive information is set in the primitive register 401. In FIG. 18, PS indicates the content of the vertex ready flag VRDY after the primitive information is set in the primitive register 401, and P indicates the content of the vertex ready flag VRDY after the replacement.

PS of the vertex ready flag VRDY after the primitive information is set in the primitive register 401 is reset to 0 in the case of a triangle strip, a triangle, a triangle fan, a line strip, or a line and is set at 1 only in the case of a point.

For example, when the primitive is a triangle strip, the vertex ready flag VRDY is reset by the setting of the primitive information in the primitive register 401. Then, when the replacement instruction is carried out two times, the three vertex data are ready, so 1 is set in the vertex ready flag VRDY at this point of time.

The geometry operation unit according to the present embodiment is realized by a micro-code base. In general, the clipping judgment and processing are carried out in the time from arrangement including the movement of the object in the world coordinate system to the projection as explained in relation to FIG. 2.

For this reason, the clipping device 400 according to the present embodiment can handle the function of the clip judgment as codes during that. These functions are prepared in the instruction set. As mentioned above, the generation of the clip code is used as the instruction "CLIPGEN", and the replacement of the clip code and the update of the VRDY flag along with the new vertex processing are used as the instruction "REPLACE".

Further, the clipping device 400 according to the present embodiment generates the CLIP flag CLPF representing the OR logic of the three vertices' worth of clip codes CLPC and the vertex ready flag VRDY indicating that the three vertices' worth of clip codes are ready as flags changing according to the above instructions.

This becomes the judgment reference of a branch instruction in a micro-program. Namely, in one series of processing carried out in the micro-code base, the CLIP flag CLPF generated at the clipping device 400 and the vertex ready flag VRDY can be used for the reference of the branch instruction.

By this flag and branch instruction, a decision as to if the vertices are ready for the count of the number of vertices and primitive, a code for storing the clip codes, and a cycle for branching by the comparison judgment can be eliminated.

The microprogram for driving the clipping device 400 according to the present embodiment is shown below:

```
New_vertex:
//new vertex:
    move r0 input        //input x coordinate to r0
    move r1 input        //input y coordinate to r1
    move r2 input        //input z coordinate to r2
    Clipgen r0 r10       //generate x coordinate CLIP
                         code
    Clipgen r1 r10       //generate y coordinate CLIP
                         code
    Clipgen r2 r10       //generate z coordinate CLIP
                         code
    Jumpclp clip_out     //to outside region processing
    :                    //each vertex processing
    Replace              //replace CLIP code & generate
                         VRDY flag
    jumpvrdy vertex_rdy  //to other processing since
                         vertex preparation is completed
    isub r16 r16 1       //number of data
    jnz new_vertex       //new vertex
    Clip_out:            //outside region processing
    :vertex_rdy:         //other processing
```

Summarizing this microprogram, the X, Y, and Z coordinates are set in the registers r0, r1, and r2, and the clip code generation circuit 405 generates 2-bit clip codes CLPC concerning the X, Y, and Z coordinates.

The clip codes generated based on the control signal S414 of the controller 414 by receiving the clip code generation instruction CLIPGEN are shifted into the clip register 411.

The content of the clip register 411 is supplied to the logic circuit 413.

When 1 is set even in one bit, the routine shifts to the processing of the case outside of the region. On the other hand, where 1 is not set, the predetermined drawing is carried out deeming that the vertices are inside the region. When the replacement instruction REPLACE is input to the controller 414, in accordance with the type of the primitive set in the primitive register 401, the replacement of the contents of the clip registers 411 to 413, that is, the clip code replacement, is carried out, and the vertex ready flag VRDY is generated parallel to this. Then, the vertex preparation is completed, and the routine shifts to other processing.

In the above processing, the number of steps relating to the clip is 10.

A microprogram relating to the general clipping is shown below:

```
N w_vertex:            //n w vertex:
    move r0 input      //input x coordinate to r0
    move r1 input      //input y coordinate to r1
    move r2 input      //input z coordinate to r2
```

```
    isub nodest r0 r10      //x coordinate -+ judgment value
    callgtz shift_in_1      //0 or less
    lshift r20 1            //left shift
    iand r20 0xfffffffe     //enter 0
    isub nodest r0 r11      //-judgment value-x coordinate
    callltz shift_in_1      //0 or more
    lshift r20 1            //left shift
    iand r20 0xfffffffe     //enter 0
    isub nodest r1 r10      //y coordinate -+ judgment value
    callgtz shift_in_1      //0 or less
    lshift r20 1            //left shift
    iand r20 0xfffffffe     //enter 0
    isub nodest r11 r1      //-judgment value -y coordinate
    callltz shift_in_1      //0 or more
    lshift r20 1            //left shift
    iand r20 0xfffffffe     // nter 0
    isub nod st r2 r10      //z coordinate -+ judgm nt value
    callgtz shift_in_1      //0 or less
    shift r20 1             //left shift
    iand r20 0xfffffffe     //enter 0
    isub nodest r11 r2      //-judgment value-z coordinate
    callltz shift_in_1      //0 or more
    lshift r20 1            //left shift
    iand r20 0xfffffffe     //enter 0
    isub nodest r20 0       //0?
    jnz clipout             //to outside region processing
    :                       //each vertex processing
    replace
    iadd r12 r12 1          //increment vertex
    iadd r13 r12 3          //vertexes complete?
    jump vertex_rdy         //to vertex completion
                            processing
    isub r16 r16 1          //decrement data number
    jnz new_vertex          //to new vertex
    shift_in_1:             //left shift
    lshift r20 1            //enter 1
    ior r20 0x00000001
    return
    clip_out:               //outside region processing
    : vert x_rdy:           //other processing:
```

As a result, the number of steps relating to the clip becomes 28.

According to this result, according to the present embodiment, an increase of speed of 18 cycles in comparison with the conventional device becomes possible. The processing per primitive takes about 100 cycles, so this corresponds to an increase of speed of about 20%.

As explained above, according to the present embodiment, since provision was made of a clip code generation circuit 405 for generating clip codes obtained by setting data in accordance with results of comparison of vertex coordinates of a triangle primitive and a judgment reference value of a multi-dimensional region and a negative value of the judgment reference value as bit data for the vertices of the primitive; a current clip register 411 for shifting the clip codes generated at the clip code generation circuit 405 in accordance with a control signal; clip registers 412 and 413 cascade connected to the output of the current clip register and able to replace the clip codes in accordance with a control signal; a control circuit 414 outputting a control signal S414 to the current clip register to shift the clip codes when receiving a clip code generation instruction and outputting a control signal S414 to the corresponding clip register so as to replace the clip codes in accordance with the type of the primitive between adjacent clip registers including the current clip register when receiving the replacement instruction; and a logic circuit 415 for performing a logic operation with respect to all bit data set in the clip registers including the current clip register and setting a clip flag indicating whether or not the vertex to be judged is inside or outside of a multi-dimensional region of the object to be drawn, the following effects can be obtained.

According to the present embodiment, there are the advantages that the number of processing cycles can be reduced, the circuit can be simplified, and the processing speed can be increased.

More specifically, one axis' worth of the clipping judgment can be carried out in one cycle. The clipping judgment can be realized as one function in the geometry operation unit necessary during a time from the world coordinate conversion to the viewport conversion, and it is possible to make good use of hardware resources originally necessary for the coordinate conversion.

Three-dimensions', X, Y, and Z, worth of results can be collected at the same position in 3 cycles and can be referred to as a flag when any of X, Y, or Z is outside of the region.

Also the three vertices' worth of results of the triangle primitive composing the polygon can be collected at the same position and can be referred to as a flag when any of the three vertices is outside the region. In continuous drawing of primitives such as a triangle mesh, it is possible to always judge a group of vertices currently covered when the next vertex processing arrives.

Summarizing the effects of the invention, as explained above, according to the present invention, there are the advantages that the number of processing cycles can be reduced, the circuit can be simplified, and the processing speed can be increased.

While the invention has been described with reference to specific embodiments chosen for purpose of illustration, it should be apparent that numerous modifications could be made thereto by those skilled in the art without departing from the basic concept and scope of the invention.

What is claimed is:

1. A clipping device for judging whether or not vertices expressed by a predetermined coordinate system are inside or outside a multi-dimensional region of an object to be drawn, comprising:
   a clip code generation circuit for generating clip codes obtained by setting data in accordance with results of a comparison of coordinates of said vertices and a judgment reference value of said multi-dimensional region and a negative value of the judgment reference value as bit data;
   a current clip register for shifting the clip codes generated at said clip code generation circuit;
   clip registers cascade connected to an output of said current clip register for replacing the held data with the clip codes held by the register of a previous stage; and
   a logic circuit for performing a logic operation with respect to all bit data set in said clip registers and setting a clip flag indicating whether or not a vertex to be judged is inside or outside the multi-dimensional region of the object to be drawn,
   wherein,
   the current clip register includes a first clip register and corresponding first multiplexer, a second clip register and corresponding second multiplexer, and a third clip register and corresponding third multiplexer,
   the first multiplexer selects a clip code CLPC or a parameter for initialization from the clip code generation circuit and outputs the selection to a lower 2 bits of the first register,
   the second multiplexer selects the output of the first register or logic 0 and outputs the selection to a middle 2 bits of the second register, and
   the third multiplexer selects the output of the second register or logic 0 and outputs the selection to an upper 2 bits of the third register; and said clip registers have a capacity for holding at least said plurality of clip codes.

2. The clipping device as set forth in claim 1, wherein:
   said coordinates of vertices include values corresponding to a plurality of coordinate axes of the predetermined coordinate system,
   said clip code generation circuit generates a plurality of clip codes corresponding to the coordinate axes.

3. The clipping device as set forth in claim 1, wherein said clip code generation circuit generates said clip codes based on code data obtained by subtracting an absolute value of said judgment reference value from the absolute value of said vertex coordinates, code data of said vertex coordinates, and code data of said judgment reference value.

4. The clipping device as set forth in claim 2, wherein said clip code generation circuit generates said clip codes based on code data obtained by subtracting an absolute value of said judgment reference value from the absolute value of said vertex coordinates, code data of said vertex coordinates, and code data of said judgment reference value.

5. A clipping device for judging whether vertices of a primitive expressed by a predetermined coordinate system are inside or outside of a multi-dimensional region of an object to be drawn, a polyhedron being drawn in units of primitives including a plurality of vertices, comprising:
   a clip code generation circuit for generating clip codes obtained by setting data in accordance with results of a comparison of vertex coordinates of said primitive and a judgment reference value of said multi-dimensional region and a negative value of the judgment reference value as bit data for the amount of the vertices of the primitive;
   a current clip register for a shifting the clip codes generated at said clip code generation circuit in accordance with a control signal;
   clip registers, of at least a number smaller than the number of the vertices of said primitive by one, cascade connected to an output of said current clip register for replacing the held data with the clip codes held by the register of a previous stage in accordance with a control signal;
   a control circuit for outputting said control signal to the current clip register when receiving a clip code generation instruction to shift the clip codes generated at said clip code generation circuit and outputting said control signal to a corresponding clip register so as to replace the clip codes between adjacent clip registers including said current clip register when receiving a replacement instruction; and
   a logic circuit for performing a logic operation with respect to all bit data set in the clip registers including said current clip register and setting a clip flag indicating whether or not the vertex to be judged is inside or outside the multi-dimensional region of the object to be drawn,
   wherein,
   the current clip register includes a first clip register and corresponding first multiplexer, a second clip register and corresponding second multiplexer, and a third clip register and corresponding third multiplexer,
   the first multiplexer selects a clip code CLPC or a parameter for initialization from the clip code generation circuit and outputs the selection to a lower 2 bits of the first register, the second multiplexer selects the output of the first register or logic 0 and outputs the selection to a middle 2 bits of the second register, and the third multiplexer selects the output of the second register or logic 0 and outputs the selection to an upper 2 bits of the third register.

6. The clipping device as set forth in claim 5, wherein said control circuit outputs said control signal to a corresponding clip register to replace the clip codes along with the vertex processing in accordance with the type of the primitive.

7. The clipping device as set forth in claim 5, wherein said control circuit generates a vertex ready flag indicating that a quantity of vertex of clip codes of said primitive are ready at the time of execution of the replacement instruction.

8. The clipping device as set forth in claim 6, wherein said control circuit generates a vertex ready flag indicating that a quantity of vertex clip codes of said primitive are ready at the time of execution of the replacement instruction.

9. The clipping device as set forth in claim 5, wherein said control circuit selectively initializes a desired register among a plurality of clip registers including said current clip register under predetermined conditions.

10. The clipping device as set forth in claim 6, wherein said control circuit selectively initializes a desired register among a plurality of clip registers including said current clip register under predetermined conditions.

11. The clipping device as set forth in claim 5, wherein:

said coordinates of said vertices include values corresponding to a plurality of coordinate axes of a predetermined coordinate system, and said clip code generation circuit generates a plurality of clip codes corresponding to the coordinate axes, and said clip registers have capacities for holding at least said plurality of clip codes.

12. The clipping device as set forth in claim 5, wherein the clip code generation circuit generates said clip codes based on code data obtained by subtracting an absolute value of said judgment reference value from the absolute value of said vertex coordinates, code data of said vertex coordinates, and code data of said judgment reference value.

* * * * *